United States Patent
Stephens et al.

[11] Patent Number: 5,844,722
[45] Date of Patent: Dec. 1, 1998

[54] INTERNAL APERTURE MASK FOR EMBEDDED OPTICS

[75] Inventors: Craig P. Stephens, Carlsbad; David G. Jackson, Oceanside; Chun-Pang Li, San Marcos; Javier A. Ruiz, Oceanside; Rodney D. Sterling, Carlsbad, all of Calif.

[73] Assignee: Hughes-JVC Technology Corporation, Carlsbad, Calif.

[21] Appl. No.: 864,884

[22] Filed: Jun. 5, 1997

[51] Int. Cl.⁶ .............................. G02B 27/14; G02B 7/02
[52] U.S. Cl. .............................. 359/637; 359/811; 353/33
[58] Field of Search ................................. 359/629, 634, 359/637, 639, 640, 811, 818, 819; 349/5, 57; 353/33

[56] References Cited

U.S. PATENT DOCUMENTS

| | | | |
|---|---|---|---|
| 2,403,731 | 7/1946 | MacNeille | 88/65 |
| 4,890,901 | 1/1990 | Cross, Jr. | 350/168 |
| 4,943,155 | 7/1990 | Cross, Jr. | 353/33 |
| 5,184,238 | 2/1993 | Wright | 349/57 |
| 5,515,169 | 5/1996 | Cargill et al. | 359/634 |

FOREIGN PATENT DOCUMENTS

WO 89/05992   6/1989   WIPO ................................. 359/637

*Primary Examiner*—Huy Mai
*Attorney, Agent, or Firm*—Harness, Dickey & Pierce, P.L.C.

[57] ABSTRACT

An optical system is provided that has an enclosure which is substantially filled with a fluid. The enclosure also has an aperture for receiving an electromagnetic wave that is altered by an optical component contained in the enclosure. The enclosure also has an aperture mask and blocker that are at least partially immersed in the fluid.

20 Claims, 4 Drawing Sheets

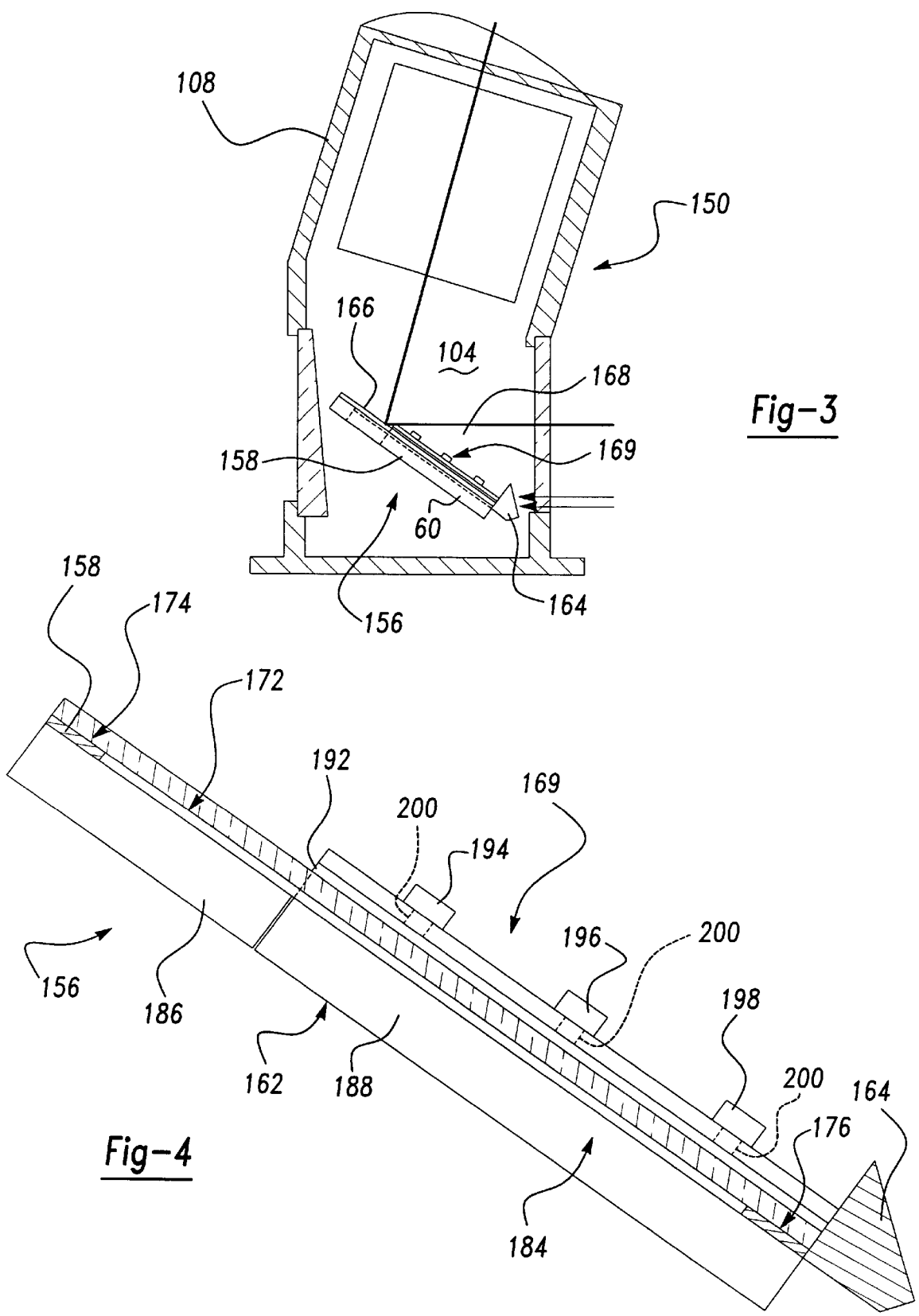

INTERNAL APERTURE MASK FOR EMBEDDED OPTICS

BACKGROUND OF THE INVENTION

1. Field of the Invention

The present invention relates to embedded optical systems, and more particularly concerns the reduction of light scattering and fluid introduced aberrations found in embedded optical devices.

2. Description of Related Art

A type of optical lens widely used for selectively passing and reflecting a light beam has a thin, flat, parallel sided, transparent plate mounted in a transparent liquid medium at an angle, commonly about 45 degrees to the axis of a beam of light that is to be transmitted or reflected. Such lenses, which are generally referred to as beamsplitters, may be polarizing or non-polarizing.

A common polarizing beamsplitter is the MacNeille prism as described in U.S. Pat. No. 2,403,731. This prism passes light having one polarization state, such as the "P" state, and reflects light with another polarization state, such as the "S" state. Therefore, the polarization beamsplitter selectively passes or transmits a light beam, depending upon whether the polarization vector of the light is one or the other of two mutually orthogonal directions. In the MacNeille prism, multiple dielectric layers, having appropriate indices of refraction and thicknesses, are deposited at the interface between two halves of a glass cube of which the mating interface extends diagonally between two diagonally opposite edges of the cube.

MacNeille polarization beamsplitters are generally housed in a cubic configuration provided with transparent front, back, entrance, and exit windows. This housing is filled with a fluid in which a prism plate, comprising a thin plate with mutually parallel planar sides that extend diagonally across the cube, is suspended. The fluid, which is typically an optical grade oil or fluid as described in pending U.S. patent application Ser. No. 08/542,396, minimizes astigmatism and maximizes image contrast. Furthermore, contrast ratio and light efficiency are improved with embedded optics since the system components are not exposed to air which places dust and other airborne contaminants into imaging paths.

Embedded optics, e.g. embedded MacNeille type polarizing beamsplitters, are useful in a wide variety of applications. One example of such an application is a color projection system employing a liquid crystal light valve. In a color projection system, light from a light source is reflected from a MacNeille prism to a liquid crystal light valve, which causes the light valve to reflect light of a particular polarization in accordance with modulation imposed on the light valve by an image generator, such as a cathode ray tube. The uniquely polarized light modulated and retro-reflected from the light valve is then transmitted through the embedded MacNeille prism and projected via a projection lens.

Transmission of the polarized light through the embedded prism configuration is subject to light scattering at the top of the projected image. This undesirable light scattering is believed to be attributable to transmitted light glancing off the machined edges around the output window, and also because the polarizer does not generally cover the entire output window so that unpolarized light can pass by the polarizer and scatter up. Furthermore, transmitted light is refracted off components, resulting in the addition of extraneous components to the projected image. The same transmission of light through the embedded optics also causes resolution loss. This is the result of turbulence created by heat convection currents in the housing fluid, as even minor temperature variations in a fluid will cause optical path variations.

Accordingly, it is an object of the present invention to reduce the light scattering produced by devices that use embedded optics. It is also an object of the present invention to reduce aberrations generated by varied heating of the material in which the optics are immersed. Furthermore, additional advantages and features of the present invention will become apparent from the subsequent description and the appended claims, taken in conjunction with the accompanying drawings.

SUMMARY OF THE INVENTION

In accordance with the teachings of the present invention, an optical system is provided. The optical system comprises an enclosure that is substantially filled with a fluid and having an aperture for receiving an electromagnetic wave. An optical component is contained in the enclosure for altering the electromagnetic wave received by the enclosure, and includes an aperture mask and blocker that are at least partially immersed in the fluid.

BRIEF DESCRIPTION OF THE DRAWINGS

Other objects and advantages of the invention will become apparent upon reading the following detailed description and upon reference to the following drawings, in which:

FIG. 3 is a side elevation view of a polarization beamsplitter assembly, with the side of the housing removed, including the internal aperture mask according to the preferred embodiment of the present invention;

FIG. 4 is an enlarged cross-sectional view of the internal aperture mask of the present invention, taken through section line 4—4 of FIG. 5;

DESCRIPTION OF THE PREFERRED EMBODIMENTS

The following description of the preferred embodiment is merely exemplary in nature and is in no way intended to limit the invention or its application and uses.

Figure 1:
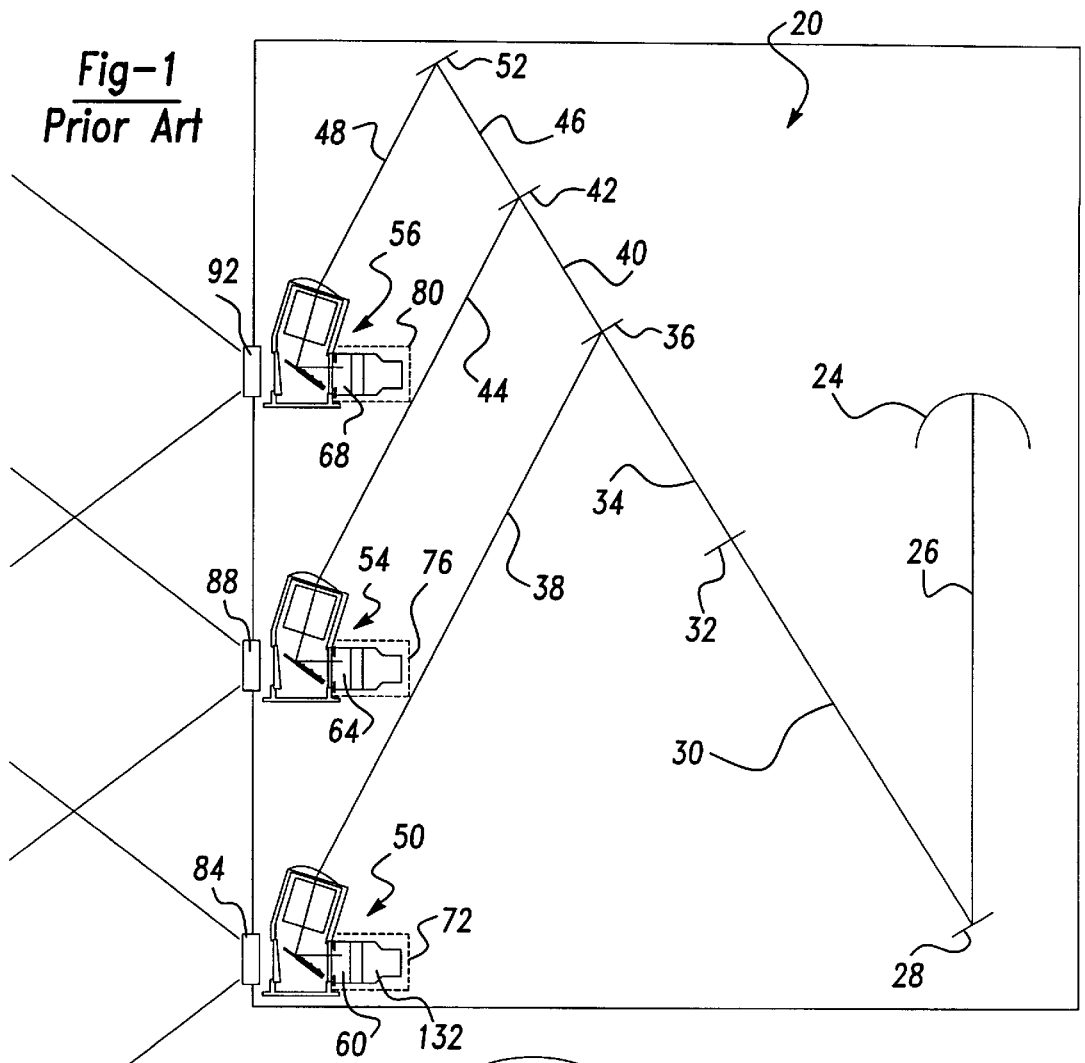
FIG. 1 is a schematic diagram illustrating a basic optical configuration for a prior art liquid crystal light valve projector.

FIG. 1 illustrates the basic optical configuration for a liquid crystal light valve color projection system 20. The color projection system 20 includes an arc lamp illumination source 24 which provides unpolarized white light represented generally by ray trace 26, to a cold mirror 28. The cold mirror 28 particularly functions to redirect the unpolarized white light 26 from the illumination source 24 and to remove heat from such light. The unpolarized light 30 reflected from the cold mirror 28 is directed to a prepolarizer 32 which polarizes the light to P polarized light and transmits P polarized light, represented by ray trace 34.

The P polarized light 34 is transmitted from the prepolarizer 32 to a blue dichroic separator 36. The dichroic separator 36 reflects the blue wavelength portion 38 of the incident light 34 and transmits the remaining portion 40. In this case, the remaining portion 40 includes the red and green wavelength portions of the incident light. The plane of the blue dichroic separator 36 is oriented such that the reflected light 38 is directed to the blue polarization beamsplitter assembly 50.

The light 40 transmitted through the dichroic separator 36 illuminates a red dichroic separator 42 which reflects the red wavelength portion 44 of the incident light and transmits the remaining portion, which in this case is the green wavelength portion 46 of the incident light. The plane of the red dichroic separator 42 is oriented such that the reflected light 44 is directed to the red polarization beamsplitter assembly 54. The transmitted green wavelength portion 46 of the incident light is provided to the green dichroic mirror 52, which reflects the green wavelength portion 48 to the green polarization beamsplitter assembly 56.

The blue, red, and green polarization beamsplitter assemblies 50, 54, 56 each receive the corresponding blue, red, and green wavelength portions of incident light 38, 44, 48, respectively. The received light is presented to the light valves 60, 64, 68 of three cathode ray tube (CRT) light valve assemblies 72, 76, 80. These CRT light valve assemblies 72, 76, 80 then modulate and reflect the light incident thereon based upon the information presented by the CRTs. The light reflected back from the CRT is then provided to projection lenses 84, 88, 92 for convergence purposes to create a projected color image.

Figure 2:
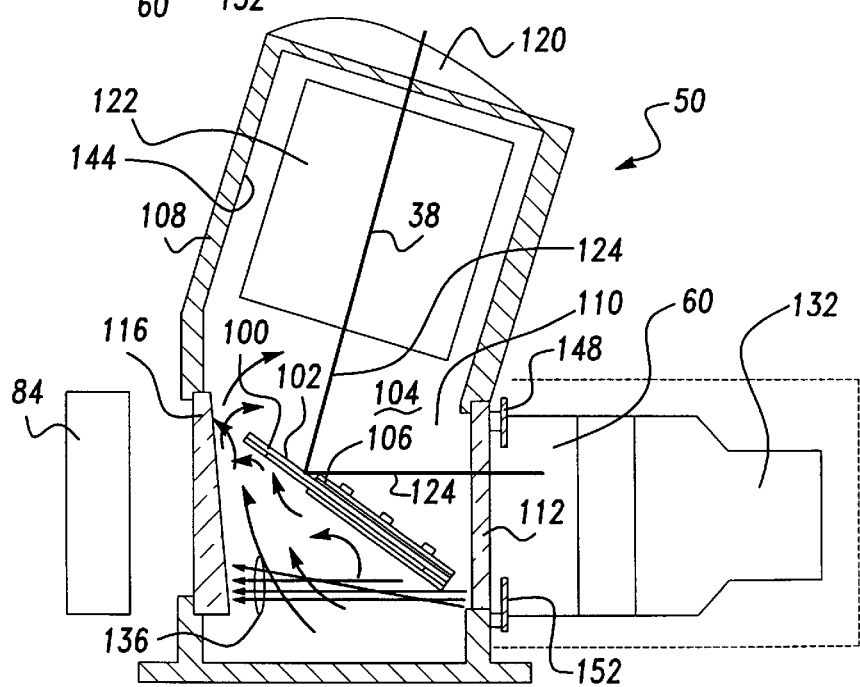
FIG. 2 is an enlarged side elevation view of the polarization beamsplitter assembly shown in FIG. 1 with a side of the housing removed.

FIG. 2 shows the blue polarization beamsplitter assembly 50 in further detail. While the following description is provided with reference to the blue polarization beamsplitter 50, it is readily understood that this description is applicable to the other two beamsplitter assemblies 54, 56 and to embedded optical assemblies in general.

The blue polarization beamsplitter assembly 50 comprises a parallel flat sided transparent prism plate 100 coated with a plurality of thin, dielectric layers 102 and suspended in a prismatic fluid 104. The polarization beamsplitter assembly 50 includes a clamp assembly 106 extending from one wall 110 of a fluid tight housing 108. The housing 108 has a transparent front window 112, a transparent exit window 116, and a transparent input window 120.

The polarization beamsplitter 50 receives blue P polarized light 38 reflected from the blue dichroic separator 36 through the input window 120. This light is first received by a prepolarizer 122 that reflects S polarized light and transmits P polarized light 124. After the prepolarizer 122, the light is presented to the prism plate 100 that reflects P polarized light 124 and transmits S polarized light, in this instance.

Reflected P polarized light travels along a path represented by reflected beam 124 to the liquid crystal light valve 60 that is modulated by an image generating source, such as a cathode ray tube 132. Where the screen of the cathode ray tube 132 has no phosphor emission and is therefore dark, the corresponding area of the light valve 60 remains in the off state, and light is retro-reflected from the light valve 60 back to the polarizing prism 100 with its polarization state unchanged. Because the polarization of the light is unchanged from its original P state, the light is again reflected from the beamsplitter prism plate 100 and exits through the input window 120. For those phosphor areas of the screen of the cathode ray tube 132 that are bright, some or all of the light reflected from the light valve 60 is rotated from the P polarization state to the S polarization state, and acquires an intensity proportional to the intensity of the light from the screen of the cathode ray tube 132. This light of polarization state S is retro-reflected by the light valve 60 and transmitted through the prism plate 100, through an optically transparent wedge that forms the exit window 116, and out to the projection lens 84.

As described for example in U.S. Pat. Nos. 4,890,901 and 4,943,155 to Cross Jr., use of a wedge shape for the exit window 116 substantially corrects lateral chromatic aberration in embedded prism configurations. However, in addition to the lateral chromatic aberrations that exist in these embedded systems, additional irregularities have been identified that negatively affect the projected image produced by the embedded prism plate 100.

As can be seen in FIG. 2, the embedded prism plate 100 of the prior art has scattered light 136 that introduces irregularities in a generated image, especially above the top of an image. (Note: The light at the bottom of the prism plate 100 corresponds to the top of the image.) One source of the scattered light 136 is the edge of the prism plate 100. This is due to the edges of the prism plate 100, whether polished or not, allowing light to pass that is not fully modulated. This transmission of unmodulated light is the result of the coatings applied to prism plate 100 failing to completely cover the plate surface. In addition, the edge of the prism plate 100 is slightly beveled to reduce the possibility of chipping. The precision in the prism plate coating is dependent upon tooling, with the inability to properly extend the coating thereby producing tooling marks. Experimentation relating to methods of treating the edges of the prism plate 100 has not produced satisfactory results in removing the tooling marks without blocking incident light.

Scattered light is also produced because the length of the prism plate 100 cannot generally be extended such that the front window 112 is completely covered. Therefore, light reflected from the light valve 60 is passed under the prism plate 100. In addition, scattered light is produced by reflections off machined edges 144 of the housing 108. Each of these scattered light sources individually, and in the aggregate, generate an objectionable and distracting "halo" above the projected image, especially when the image is viewed in a dark or nearly dark environment.

Prior to the present invention, the light scattering problem had been dealt with by external aperture masks 148, 152. However, the aperture masks 148, 152 tend to degrade the uniformity of the light beam as reflected from the light valve 60, ultimately reducing projector brightness. Furthermore, the external aperture masks 148, 152 do not correct light scattering due to the reflection off of the housing edges 144.

With reference now to FIG. 3, a polarization beamsplitter 150 that has an internal aperture mask assembly 156 according to a preferred embodiment of the present invention is shown. An enlarged view of the mask assembly 156 is illustrated in FIG. 4. The mask assembly 156 includes an internal aperture mask 158 having a pair of prismatic fluid channeling rails 160, 162 (FIG. 5) extending downwardly along the two sides of the mask 158, and a blocking member 164 extending substantially along the length of a bottom edge of the internal aperture mask 158. The mask assembly 156 also includes a polarizing plate 166 that is affixed to the top surface of the internal aperture mask 158. The mask assembly 156 is affixed to a mask housing 168 via clamp assembly 169.

Figure 5:
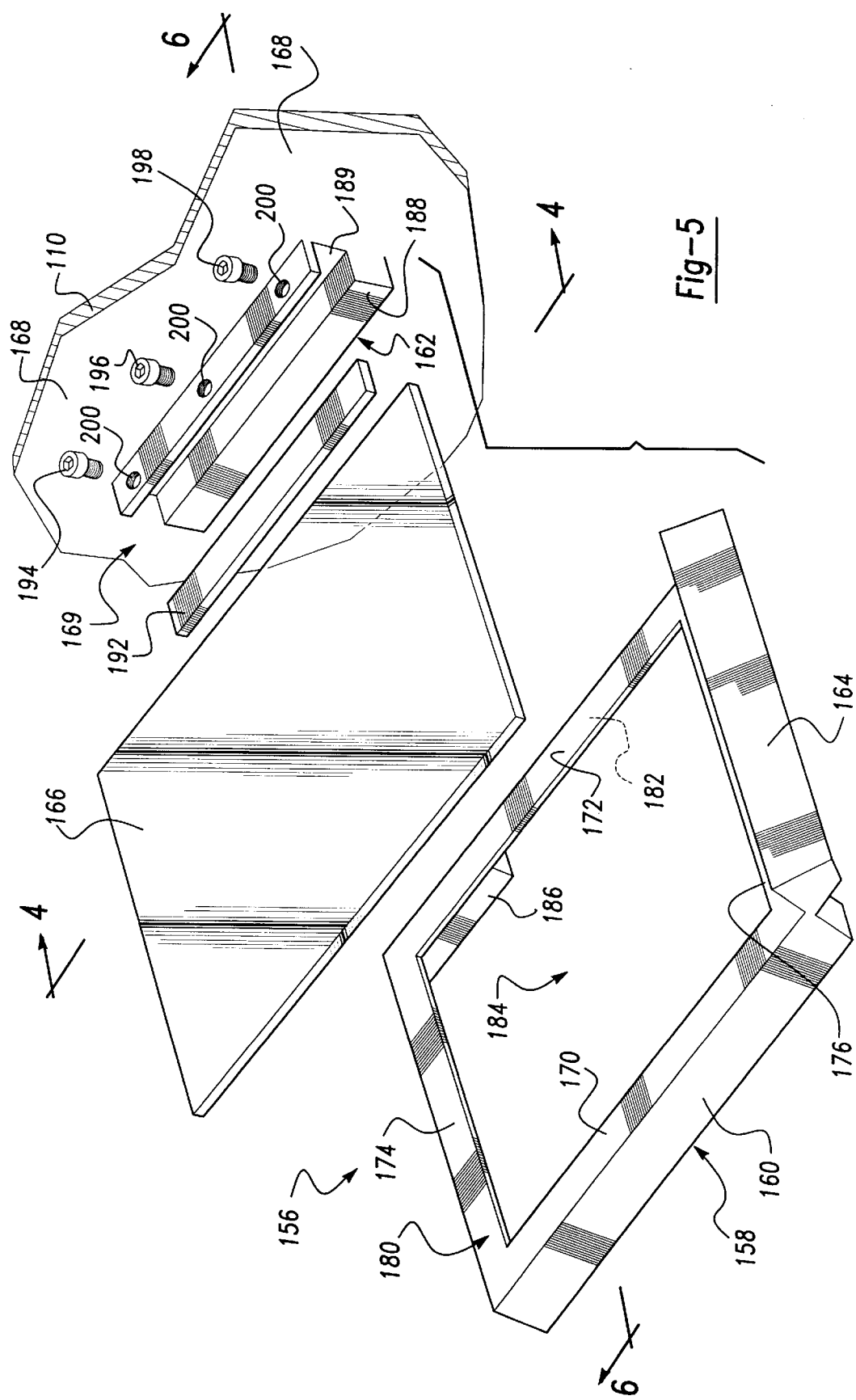
FIG. 5 is an exploded perspective view of the components of the aperture mask according to the preferred embodiment of the present invention including a clamp assembly, plate, and aperture mask.
Figure 6:
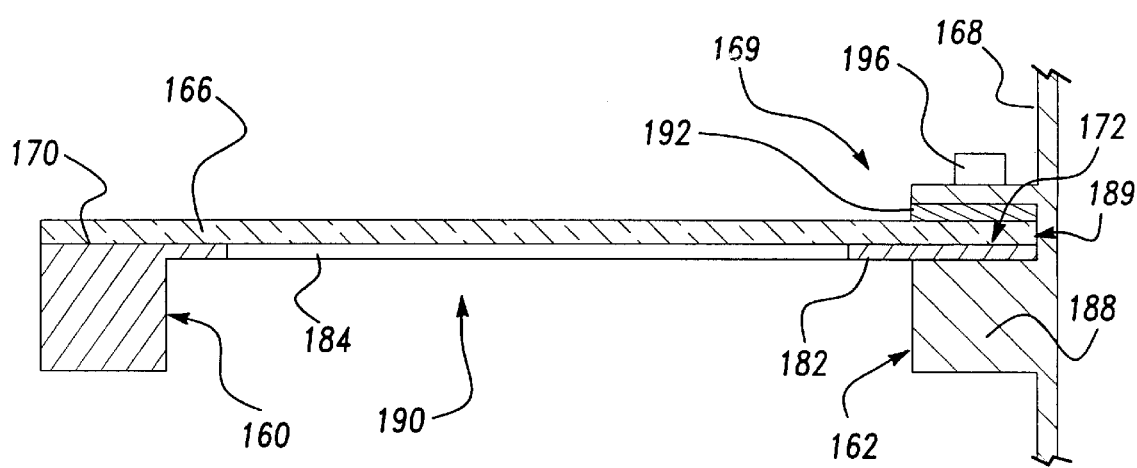
FIG. 6 is a cross-sectional view of the aperture mask, clamp assembly, and plate, taken through section line 6—6 of FIG. 5.

Referring to FIGS. 4 and 5, the aperture mask 158 is preferably rectangular in shape and includes first and second side surfaces 170, 172 and first and second end surfaces 174, 176. The side and end surfaces define both a top polarizing plate mounting surface 180 and a bottom clamping surface 182 (FIG. 6). The aperture mask 158 is configured to define an aperture 184 through which light polarized by the light valve 60 passes. Preferably, the aperture mask 158 is formed from black anodized aluminum, with the anodization process being stabilized in water. The aluminum is preferably of a type such as alloy 6061 that does not include surface particles formed by anodization. However, the aperture mask 158 may be formed from any durable, lightweight material suitable for such an application.

The aperture mask 158 also includes the integrally formed fluid channel rail 160 that extends downwardly along the first side surface 170. The aperture mask 158 also includes an integrally formed first partial rail 186 that extends downwardly partially along the second side surface 172. As described below, the clamp assembly 169, which is preferably integrally formed with the mask housing 168, defines a second partial rail 188 which in combination with partial rail 186 comprises the complete fluid channel rail 162 when the mask assembly 156 is clamped thereto, it being understood and shown in FIG. 4 that first partial rail 186 abuttingly engages second partial rail 188. In conjunction, the two rails 160, 162 form a channel 190 under the polarizing plate 166. (See FIG. 6 for a section view of the mask, clamp assembly, and plate, taken through section line 6—6 of FIG. 5).

The channel 190 created by the rails 160, 162 reduces the amount of lateral flow in the prismatic fluid 104 contained in the housing 108. Because the prismatic fluid 104 rises as it warms, it will travel upward, along the bottom surface of the polarizing plate 166, and into the upper portions of the housing 108. Fluid 104 contained in the top of the housing 108 is relatively cooler, and flows down across the top surface of the polarizing plate 166. Because the polarizing plate 166 is attached to the wall 110 on one side of the housing 108, the cooler fluid flowing down across the face of the plate 166, and the warmer fluid flowing up the bottom surface of the plate 166, is partially directed sideways (i.e. away from the housing wall 110 to which the assembly 156 is mounted). This generates an eddy current on the top surface of the polarizing plate 166, with a quiet area in the center of any current accumulating micro-particles.

This particle accumulation can continue to increase over time and ultimately result in the reduction of light due to the scattering from the deposits. Furthermore, striations due to the upward movement of the prismatic fluid lateral flow often result in resolution loss during a warm up period, especially in larger fluid filled optical devices. With the channel 190 formed by the aperture mask 158 and the clamp assembly 169, the lateral flow across the polarizing plate 166 is reduced, resulting in the reduction of particle accumulation and resolution loss.

Referring now to FIG. 5, the mask assembly 156 also includes the blocking member 164. The blocking member 164 is disclosed as a flanged lip that is affixed to and extends substantially along the length of the second end 176 of the aperture mask 158. The blocking member 164 is preferably integrally formed with the aperture mask 158 from the above described black anodized aluminum. The blocking member 164 impedes light reflected from the machined edges and the edge of the polarizing plate 166, as well as the light passing under the polarizing plate 166. The blocking member 164 therefore substantially reduces the halo effect above the projected image, often present in conventional mask assemblies, while maintaining beam uniformity.

With continued reference to FIG. 5, assembly of the mask assembly 156 of the present invention will now be described. Initially, the polarizing plate 166 is positioned on the top surface of the aperture mask 158, and the mask assembly 156 is oriented with respect to the mask assembly housing 168 as shown. The mask assembly 156 is then inserted into a channel 189 of the clamping assembly 169. A keeper bar 192 is placed on top of polarizing plate 166 and operates as a load spreader. Fasteners, such as screws 194, 196, 198 are then inserted through clamp fastener bores 200 and tightened into abutting contact with the keeper bar 192. The keeper bar 192 thus ensures that the polarizing plate 166 is not broken during tightening of the fasteners.

Although the invention has been described herein in connection with use in a polarizing beamsplitter prism 166 forming a part of a liquid crystal light valve projector system, it will be readily appreciated that the principles of the invention are applicable to other types of embedded prisms, whether polarizing or non-polarizing.

Those skilled in the art can now appreciate from the foregoing description that the broad teachings of the present invention can be implemented in a variety of forms. The principles provided here are readily adaptable for many applications. Therefore, the true scope of the invention is vast, and other modifications will become apparent to the skilled practitioner upon a study of the drawings, specifications and following claims.

What is claimed is:

1. An optical system, comprising:
   an enclosure substantially filled with a fluid and having an aperture for receiving an incident electromagnetic wave;
   an optical component contained within the enclosure for altering the electromagnetic wave received by the enclosure; and
   a wave blocking member at least partially immersed in the fluid for minimizing the scattering of the incident electromagnetic wave.

2. The optical system of claim 1 wherein the wave blocking member further defines a flanged lip affixed to the optical component.

3. The optical system of claim 1 wherein the wave blocking member extends along an end of the optical component which is distal from the incident electromagnetic wave.

4. The optical system of claim 1 wherein a clamp member is associated with the enclosure for securing the optical component within the enclosure.

5. The optical system of claim 1 wherein the optical component is affixed to a frame, the frame defining an aperture for the optical component, and the frame being connected to the enclosure at a predetermined angle with respect to the incident electromagnetic wave.

6. The optical system of claim 5 wherein a clamp member is integrally formed with the enclosure for suspending the optical component and the frame in the fluid contained within the enclosure.

7. An optical system, comprising:
   an enclosure substantially filled with a fluid and having an aperture for receiving an incident electromagnetic wave;
   an optical component contained within the enclosure for altering the electromagnetic wave received by the enclosure; and
   a rail at least partially immersed in the fluid for reducing turbulent flow in the fluid.

8. The optical system of claim 7 wherein a clamp assembly is associated with the enclosure for suspending the optical component within the fluid contained within the enclosure.

9. The optical system of claim 7 wherein the optical component is affixed to a frame, the frame defining an aperture for the optical component, and the frame being connected to the enclosure at a predetermined angle with respect to the incident electromagnetic wave.

10. The optical system of claim 9 further including a pair of rails affixed to the frame and extending downwardly for defining a channel under the frame.

11. The optical system of claim 9 wherein the rail extends downwardly along a first side of the frame, and a second partial rail extends downwardly along a second side of the frame for defining a channel under the frame.

12. The optical system of claim 11 further including a clamp assembly having a bottom flange for defining a remaining portion of the second partial rail thereby extending along the second side of the frame, the clamp assembly affixing the optical component to the frame.

13. The optical system of claim 12 wherein the clamp assembly includes a keeper bar disposed on top of the optical component, and a plurality of fasteners associated with the clamp assembly for applying a force to the keeper bar and securing the optical component to the frame.

14. The optical system of claim 7 wherein the optical component includes a polarizing plate.

15. An aperture mask for use in an optical system that is at least partially embedded in a fluid, comprising:
- a frame providing a mounting surface for an optical component, the frame further defining an aperture for the optical component;
- a wave blocking member connected to the frame for minimizing the scattering of incoming radiation; and
- a rail connected to the frame that defines a channel for reducing turbulent flow in the fluid.

16. The aperture mask of claim 15 wherein the wave blocking member further defines a flanged lip extending along an end of the optical component which is distal from the incident electromagnetic wave.

17. The aperture mask of claim 15 wherein the rail includes a first rail extending downwardly along a first side of the frame, and a second partial rail extending partially downwardly along a second side of the frame.

18. The aperture mask of claim 17 further comprising a clamp assembly having a bottom flange for defining a remaining portion of the second partial rail thereby extending along the second side of the frame, the clamp assembly for securing the optical component to the frame.

19. The aperture mask of claim 15 wherein the optical component includes a polarizing plate.

20. A beamsplitter assembly for use in a projector system, comprising:
- a housing filled with a fluid and having an aperture for receiving an incident electromagnetic wave;
- a polarizing plate that alters the incident electromagnetic wave;
- a frame defining a mounting surface for the polarizing plate, the frame connected to the housing at a predetermined angle with respect to the incident electromagnetic wave;
- a flanged lip associated with the frame and extending along an end of the frame which is distal from the incident electromagnetic wave for impeding scattering of the incident electromagnetic wave; and
- at least one rail affixed to the frame and extending downwardly to form a channel along an underside of the frame for reducing turbulent flow in the fluid.

* * * * *